(12) United States Patent
Liu

(10) Patent No.: US 8,212,994 B2
(45) Date of Patent: Jul. 3, 2012

(54) DISTANCE DETECTING SENSOR AND CLOSE RANGE DETECTING METHOD

(75) Inventor: Xingyan Liu, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 225 days.

(21) Appl. No.: 12/612,292

(22) Filed: Nov. 4, 2009

(65) Prior Publication Data

US 2010/0110413 A1 May 6, 2010

(30) Foreign Application Priority Data

Nov. 5, 2008 (CN) .......................... 2008 1 0202228

(51) Int. Cl.
*G01C 3/08* (2006.01)
(52) U.S. Cl. ........ 356/4.01; 356/3.01; 356/3.1; 356/4.1; 356/5.01; 356/5.1
(58) Field of Classification Search ......... 356/3.01–28.5
See application file for complete search history.

(56) References Cited

U.S. PATENT DOCUMENTS

| | | | |
|---|---|---|---|
| 4,833,318 A | 5/1989 | Yonekura et al. | |
| 5,233,382 A | 8/1993 | Taniguchi et al. | |
| 5,760,390 A | 6/1998 | Vezzalini et al. | |
| 5,956,534 A | 9/1999 | Onda | |
| 6,337,736 B1 | 1/2002 | Sugiyama et al. | |
| 2004/0001193 A1 | 1/2004 | Takaoka | |
| 2004/0142705 A1* | 7/2004 | Casebolt et al. | 455/456.1 |
| 2007/0075280 A1* | 4/2007 | Nakano et al. | 250/559.38 |

FOREIGN PATENT DOCUMENTS

| | | |
|---|---|---|
| CN | 1573286 A | 2/2005 |
| CN | 1607375 A | 4/2005 |
| CN | 101042298 A | 9/2007 |
| CN | 101387515 A | 3/2009 |
| CN | 101387512 B | 6/2010 |
| CN | 101387513 B | 6/2010 |
| CN | 101387514 B | 7/2010 |

(Continued)

OTHER PUBLICATIONS

U.S. Appl. No. 13/061,096, filed Feb. 25, 2011, Tang et al.

(Continued)

*Primary Examiner* — Luke Ratcliffe
(74) *Attorney, Agent, or Firm* — Foley & Lardner LLP

(57) ABSTRACT

The present invention discloses a distance detecting sensor, comprising: a casing, focusing lenses, a circuit board mounted with several electronic elements, and an emitting device emitting infrared light and a receiving device receiving and sensing a reflected infrared light. Wherein, the casing comprises a main body and two round openings on the top surface of the main body. The lenses comprise an emitting lens and a receiving lens arranged at the openings of the casing. The circuit board is mounted in the main body of the casing; the emitting device is an infrared emitting diode (LED), emitting infrared light toward the emitting lens. The receiving device is a distance detecting sensor module, which senses the reflected light focused by the receiving lens. The distance detecting sensor further comprises an emitting light guide unit arranged between the emitting lens and the emitting device, and the emitting light guide unit comprises small round holes at the emitting tube core of the emitting device. The present invention has higher detection accuracy and improves the overall detection performance of the sensor.

11 Claims, 5 Drawing Sheets

FOREIGN PATENT DOCUMENTS

| | | |
|---|---|---|
| CN | 101220883 B | 9/2010 |
| GB | 2 352 032 B | 7/2003 |
| JP | 06-168652 A | 6/1994 |
| JP | 09-229679 A | 9/1997 |
| JP | 10-300460 A | 11/1998 |

OTHER PUBLICATIONS

U.S. Appl. No. 13/061,102, filed Feb. 25, 2011, Tang et al.
U.S. Appl. No. 13/061,107, filed Feb. 25, 2011, Tang et al.
U.S. Appl. No. 13/061,109, filed Feb. 25, 2011, Tang et al.
English Translation of International Search Report and Written Opinion for PCT/CN2009/073568, dated Dec. 3, 2009, 11 pages.
English Translation of International Search Report and Written Opinion for PCT/CN2009/073571, dated Dec. 3, 2009, 10 pages.
English Translation of International Search Report and Written Opinion for PCT/CN2009/073577, dated Nov. 26, 2009, 11 pages.
English Translation of International Search Report and Written Opinion for PCT/CN2009/073578, dated Dec. 3, 2009, 11 pages.

* cited by examiner

DISTANCE DETECTING SENSOR AND CLOSE RANGE DETECTING METHOD

TECHNICAL FIELD

The present invention relates to a distance detecting sensor applicable in the technical field of sanitary automation (e.g., automatic sensing faucets, automatic flushing urinals, etc.) and a close range detecting method of the distance detecting sensor.

BACKGROUND ART

Infrared sensors have been widely used in sanitary wares, such as automatic faucets, automatic flushing urinals, toilet flushing devices, hot water spraying toilet seats, hand driers, and toilets provided with hot air fan.

Most conventional infrared sensors adopt an active infrared detection manner, in which an infrared emitter emits an infrared light at a specific wavelength, the infrared light is reflected from human body and the signal strength of the reflected signal is judged after being received by an infrared receiver, thereby to achieve automatic sensing and judgment. However, it is difficult to achieve the automatic sensing and judgment for substances with low infrared reflectivity (e.g., black clothing, hair, etc.). After the infrared light from the infrared emitter is reflected by such substances, only a small amount of infrared light is received by the infrared receiver. Since the intensity of reflected signal is not high enough, the sensor is unable to judge whether there exists an object, and therefore the sensing fails.

In order to solve the sensing failure problem of conventional infrared sensing sanitary ware, a distance detecting sensor is introduced into the field of sanitary automation. As shown in FIG. 1, a position detecting sensor, or called as position sensitive detector (PSD) is a photoelectric device that is sensitive to the position of incident light. That is to say, when the incident light irradiates at different positions on the photosensitive surface of the device, different electric signals can be outputted. The PSD achieves automatic detection and judgment by utilizing the triangular measurement principle with which distance can be measured accurately. As shown in FIG. 1, the light emitted from the light emitting source $S_1$ is focused by a lens L1 and then projected onto the surface of an object O1 to be detected. The reflected light is focused by a lens L2 onto a one dimensional PSD (i.e., a receiving unit P1), and forms a light spot. Suppose the center distance between lens L1 and L2 is b, the distance from lens L2 to the surface of the PSD (i.e., focal length of lens L2) is f, and the distance from the light spot focused on the surface of the PSD to the center of lens L2 is x, it can be obtained based on the nature of similar triangles PAB and BCD that the distance DIS to be measured will be DIS=bf/x. Therefore, the distance of the object to be detected can be measured as long as the position coordinate x of the light spot on the PSD is obtained.

If it is detected that the distance of the object O1 falls within a preset range, the distance detecting sensor will control the operation states, including for example water output, flushing and etc, of the sanitary ware. Since the distance detecting sensor achieve the object of automatic detection by judging the distance between the object and the distance detecting sensor, it can effectively overcome the drawback of sensing failure of conventional infrared sensors.

However, there are some requirements for detection distance when such a distance detecting sensor is used. If the distance from the object to be detected to the distance detecting sensor is too close, the infrared light emitted from the light emitting source of the distance detecting sensor can't be focused onto the surface of the PSD, and therefore the detection will fail. For example, when such a distance detecting sensor is mounted on a faucet, if the hands of the user are too close to the distance detecting sensor, sensing failures happen easily.

Therefore, it is necessary to invent a distance detecting sensor and a method that can effectively overcome the drawback in the prior art.

SUMMARY OF THE INVENTION

The object of the present invention is to provide a distance detecting sensor that can detect more reliably.

The object of the present invention is attained with the following technical solution:

a distance detecting sensor mounted in sanitary ware, comprising: an infrared light emitting source, an infrared light receiving unit, and an emitting lens and an receiving lens, arranged in front of the light emitting source and the receiving unit respectively to focus infrared light. The receiving unit is a photo-electric device that is sensitive to the position of infrared light. At least a close range light emitting source is arranged near the light emitting source. The light emitting source and the close range light emitting source are light emitting diodes (LEDs).

Furthermore, the emission power of the infrared light emitting source is higher than that of the close range light emitting source.

Furthermore, the emission frequency of the infrared light emitting source and the close range light emitting source is lower when there is no object to be detected than when there is an object to be detected.

Another object of the present invention is to provide a close range detection method, which makes the distance detecting sensor operates more reliably.

The above object of the present invention can be attained with the following technical solution:

A close range detection method of a distance detecting sensor, comprising the following steps:

Step 1: activating a light emitting source to emit an infrared light, and proceeding to step 2;

Step 2: judging whether a receiving unit receives a reflected infrared light signal; if the receiving unit receives a reflected infrared light signal, going to step 5; otherwise proceeding to step 3;

Step 3: activating a close range light emitting source to emit an infrared light, and proceeding to step 4;

Step 4: judging whether the receiving unit receives a reflected infrared light signal; if the receiving unit receives a reflected infrared light signal, proceeding to step 5; otherwise returning to step 1;

step 5: calculating the distance value of an object to be detected based on the received infrared light reflected from the object;

Step 6: judging whether the distance value of the object is within a preset range; if the distance is within the preset range, proceeding to step 7; otherwise returning to step 1;

Step 7: controlling the action of the sanitary ware.

Furthermore, the emission power of the light emitting source is higher than that of the close range light emitting source.

Furthermore, the emission frequency of the light emitting source and the close range light emitting source is lower when there is no object to be detected than when there is an object to be detected.

Alternatively, the objects of the present invention can be attained with the following technical solution:

A close range detection method of a distance detecting sensor, comprising the following steps:

Step 1: activating a light emitting source and a close range light emitting source synchronously to emit an infrared light respectively, and proceeding to step 2;

Step 2: judging whether a receiving unit receives an reflected infrared light signal; if the receiving unit receives an infrared light signal, proceeding to step 3; otherwise returning to step 1;

Step 3: calculating the distance value of an object to be detected based on the received infrared light reflected from the object, and proceeding to step 4;

Step 4: judging whether the distance value of the object is within a preset range; if the distance is within the preset range, proceeding to step 5; otherwise returning to step 1;

Step 5: controlling the action of the sanitary ware.

Furthermore, the emission power of the light emitting source is higher than that of the close range light emitting source.

Furthermore, the emission frequency of the light emitting source and the close range light emitting source is lower when there is no object to be detected than when there is an object to be detected.

Alternatively, the object of the present invention can be attained with the following technical solution:

A close range detection method of a distance detecting sensor, comprising the following steps:

Step 1: activating a close range light emitting source to emit an infrared light, and proceeding to step 2;

Step 2: judging whether a receiving unit receives an infrared light signal reflected from an object to be detected; if the receiving unit receives a reflected infrared light signal, proceeding to step 3; otherwise returning to step 1;

Step 3: calculating the distance value of the object to be detected based on the received infrared light reflected from the object, and proceeding to step 4;

Step 4: judging whether the distance value of the object is within a preset close range; if the distance is within the preset close range, going to step 8; otherwise proceeding to step 5;

Step 5: activating a light emitting source to emit an infrared light, and proceeding to step 6;

Step 6: judging whether the receiving unit receives an infrared light signal reflected from the object to be detected; if the receiving unit receives an infrared light signal reflected from the object, proceeding to step 7; otherwise returning to step 1;

step 7: judging whether the distance value of the object is within a normal range; if the distance value is within the preset normal range, proceeding to step 8; otherwise returning to step 1;

Step 8: controlling the action of the sanitary ware.

Furthermore, the emission power of the light emitting source is higher than that of the close range light emitting source.

Furthermore, the emission frequency of the light emitting source and the close range light emitting source is lower when there is no object to be detected than when there is an object to be detected.

Compared with the prior art, the close range detection method of the distance detecting sensor provided in the present invention can effectively prevent incorrect operation resulted from mirror interference, make the distance detecting sensor operates more reliably, and thereby improve the overall detection performance of the distance detecting sensor.

DETAILED DESCRIPTION OF THE EMBODIMENTS

Various embodiments of the present invention will be detailed with reference to the accompanying drawings, in which identical structures or functionalities are designated with the same reference numbers. It is noted that the accompanying drawings are provided only for convenience of explanations of the embodiments, and are not superfluous description or any limitation to the present invention. In addition, the accompanying drawings may not be drawn to scale.

Figure 2:
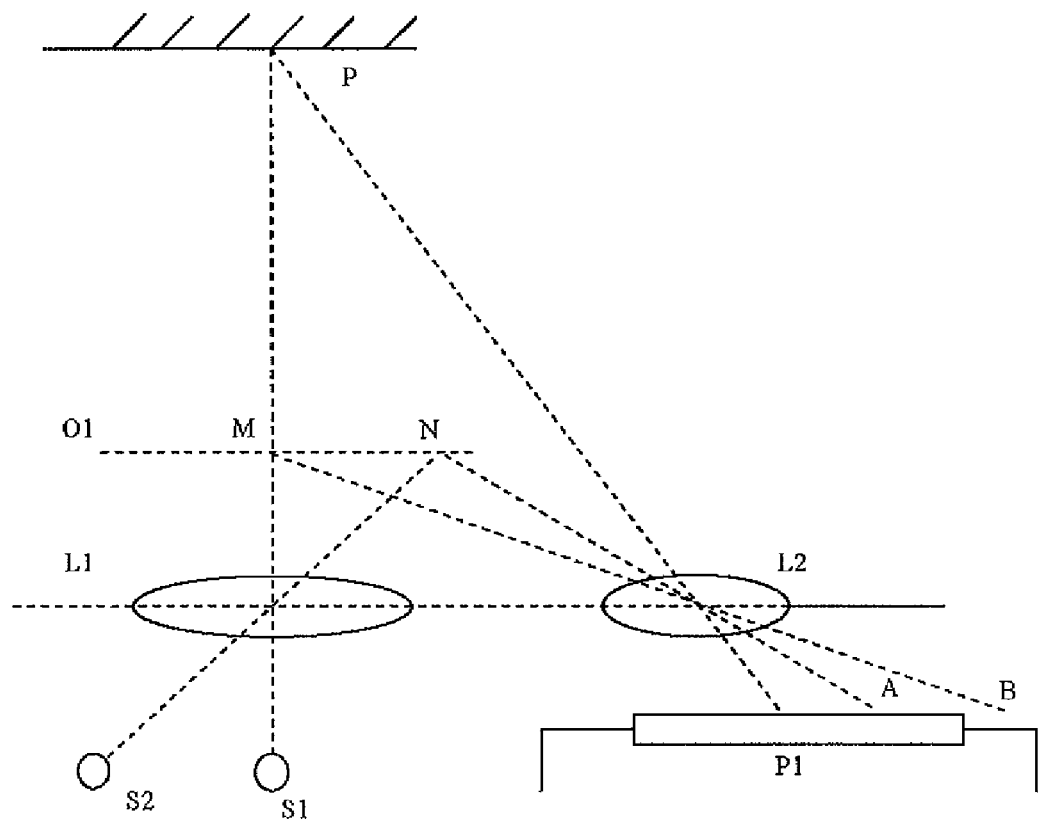
FIG. 2 is a structural schematic diagram of a distance detecting sensor in accordance with the present invention.

As shown in FIG. 2, the distance detecting sensor 100 in accordance with the present invention includes a light emitting source S1, a receiving unit P1, an emitting lens L1 and a receiving lens L2 arranged in front of the light emitting source S1 and the receiving unit P1 respectively. The light emitting source S1 is an infrared light emitting source, generally an LED. The receiving unit P1 is a photo-electric device, i.e. a PSD module that is sensitive to the position of incident infrared light on its surface. Specially, a close range light emitting source S2 is further arranged beside the light emitting source S1 of the distance detecting sensor 100. The close range light emitting source S2 is also an infrared light emitting source, generally an LED.

Figure 1:
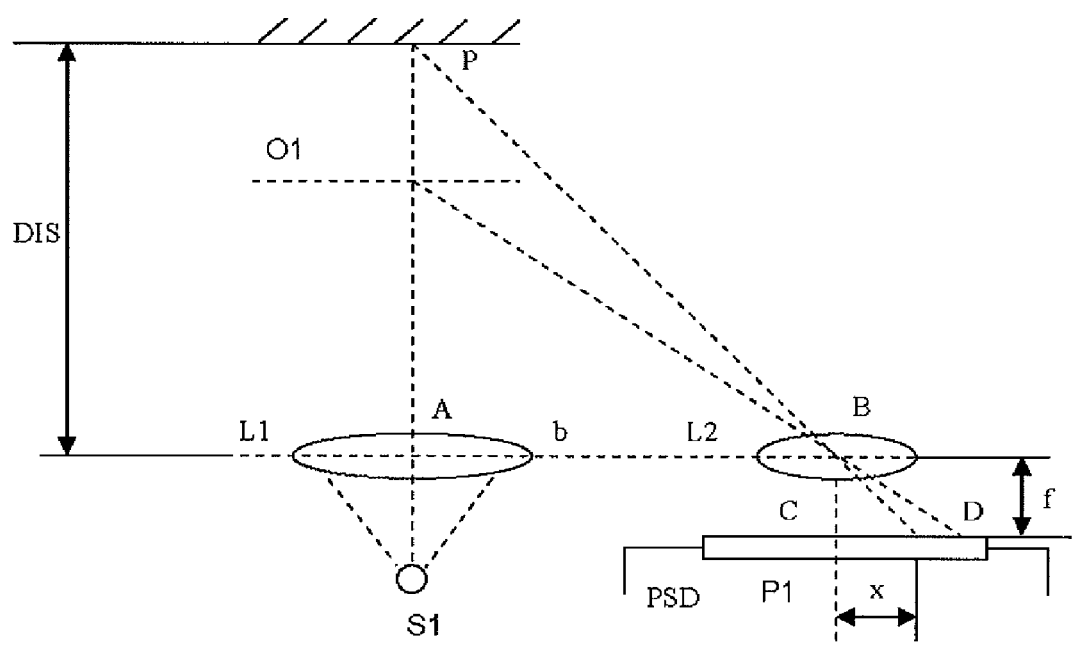
FIG. 1 is an operational principal diagram of a distance detecting sensor of the prior art.

As shown in FIG. 1, if an object O1 to be detected is in a normal detection area, the infrared light emitted from the light emitting source S1 is focused by the emitting lens L1 and then irradiated onto the object O1. The infrared light is reflected from the object O1, and the reflected infrared light can be focused by the receiving lens L2 and then irradiated onto the receiving unit P1. Furthermore, the distance from the object O1 to be detected to the distance detecting sensor 100 of the present invention is calculated on the basis of the PSD triangle principle. If the calculated distance is within the preset range, the distance detecting sensor 100 will control valve-open, valve-close and etc. of the sanitary ware through its main controller and further control actions of the sanitary ware such as water output and flushing. However, if the object O1 to be detected is too close to the distance detecting sensor 100, the case is different, specifically described as follows:

The distance detecting sensor 100 of the present invention is mounted on sanitary ware, such as a faucet or urinal, etc. The object to be detected (e.g., hands or body of the user) is often too close to the distance detecting sensor 100 of the present invention, especially in the situation where the distance detecting sensor 100 is mounted on a faucet, in which the hands of the user tend to stretch out towards the position of the detector (i.e., the distance detecting sensor 100). In such a case, the emitted infrared light, after irradiated onto the object to be detected, can not be normally reflected onto or can not be reflected onto the receiving unit and therefore can not be sensed. Thus, the distance detecting sensor 100 can't detect the object O1. This eventually results in non-operation of the corresponding sanitary ware such as faucet and urinal.

Further, as shown in FIG. 2, the infrared light emitted from the light emitting source S1 reaches the object O1 to be detected and is reflected from the object O1. Since the object O1 is too close to the distance detecting sensor 100, the infrared light MB reflected from the object O1 can't be focused by the receiving lens L2 onto the receiving unit 2. Therefore, the distance detecting sensor 100 of the present invention can't detect existence of the object O1, with the result that the sanitary wares such as faucet and urinal do not operate.

In view of the above, a close range light emitting source S2 is arranged beside the light emitting source S1 of the distance detecting sensor 100, to specially detect whether any object O1 exists within a range that is less than the normal detection range (i.e., close range). When the light emitting source S1 can't detect the object O1, the close range light emitting source S2 is activated to emit an infrared light. Because the infrared light emission angle of the close range light emitting source S2 is designed specially for close range detection, if the object O1 exists within the range that is less than the normal detection range, the light emitted from the close range light emitting source S2 will irradiate on the object O1 and will be reflected, and the reflected infrared light NA can be focused by the receiving lens L2 onto the receiving unit P1. Thereby, the distance detecting sensor 100 of the present invention can detect existence of the object O1 and calculate the distance value, on the basis of triangular principle. If the distance value is within a preset range, the distance detecting sensor 100 of the present invention can control the sanitary wares (faucet, urinal, etc.) by means of its main controller to act (e.g., open the valve, and etc.). The preset distance range described above needs to be configured in advance according to actual application environments, specifically, whenever it is judged that an object to be detected is within the preset distance range, it is believed that some user wants to use or is using a corresponding sanitary ware; and then, the sanitary ware controls the on-off valve before, during and after the use according to actual situations, thereby achieving automatic control of sanitary ware.

Figure 3:
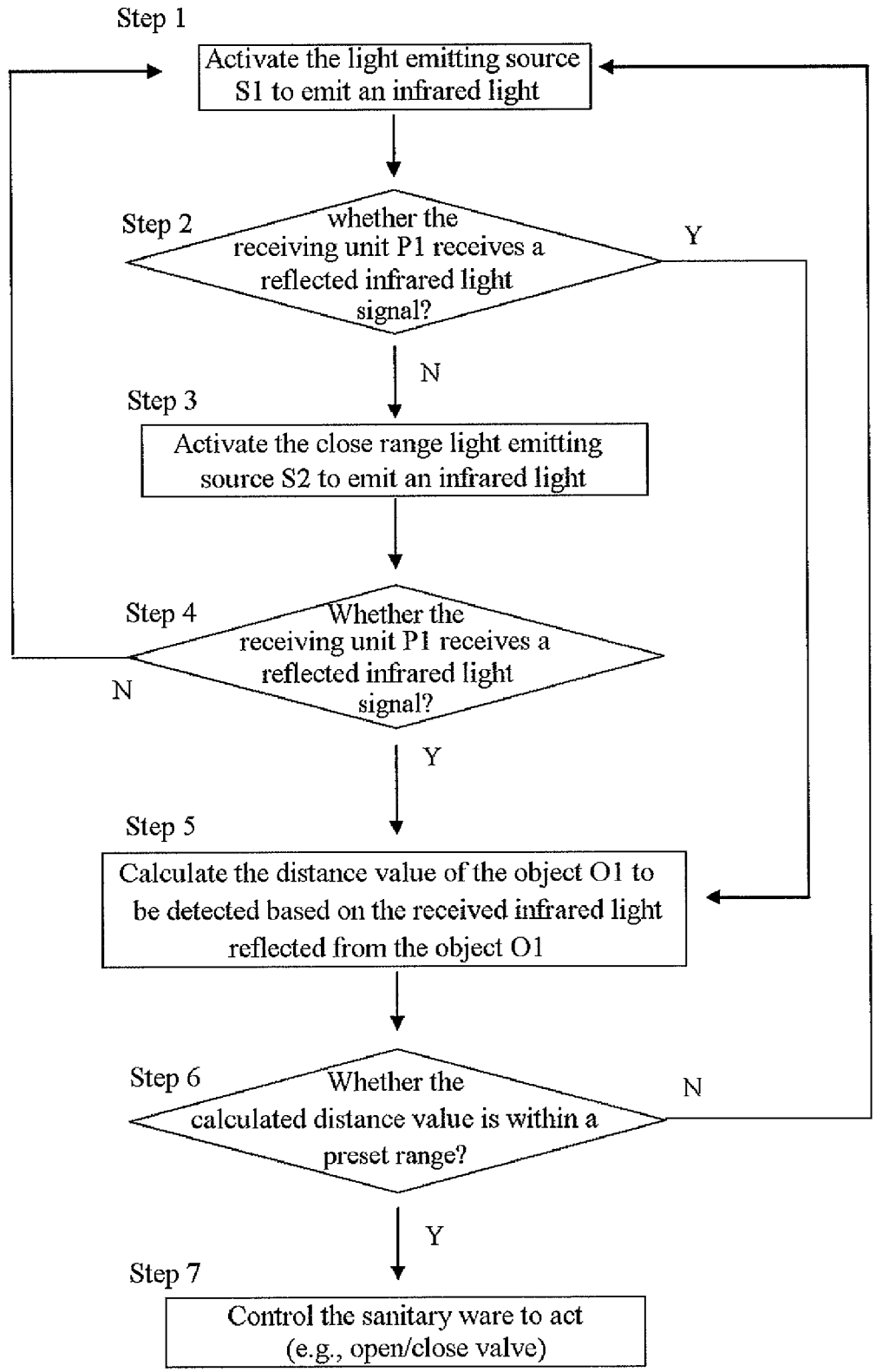
FIG. 3 is a flow chart of a close range detection method of a distance detecting sensor in accordance with an embodiment of the present invention.
Figure 4:
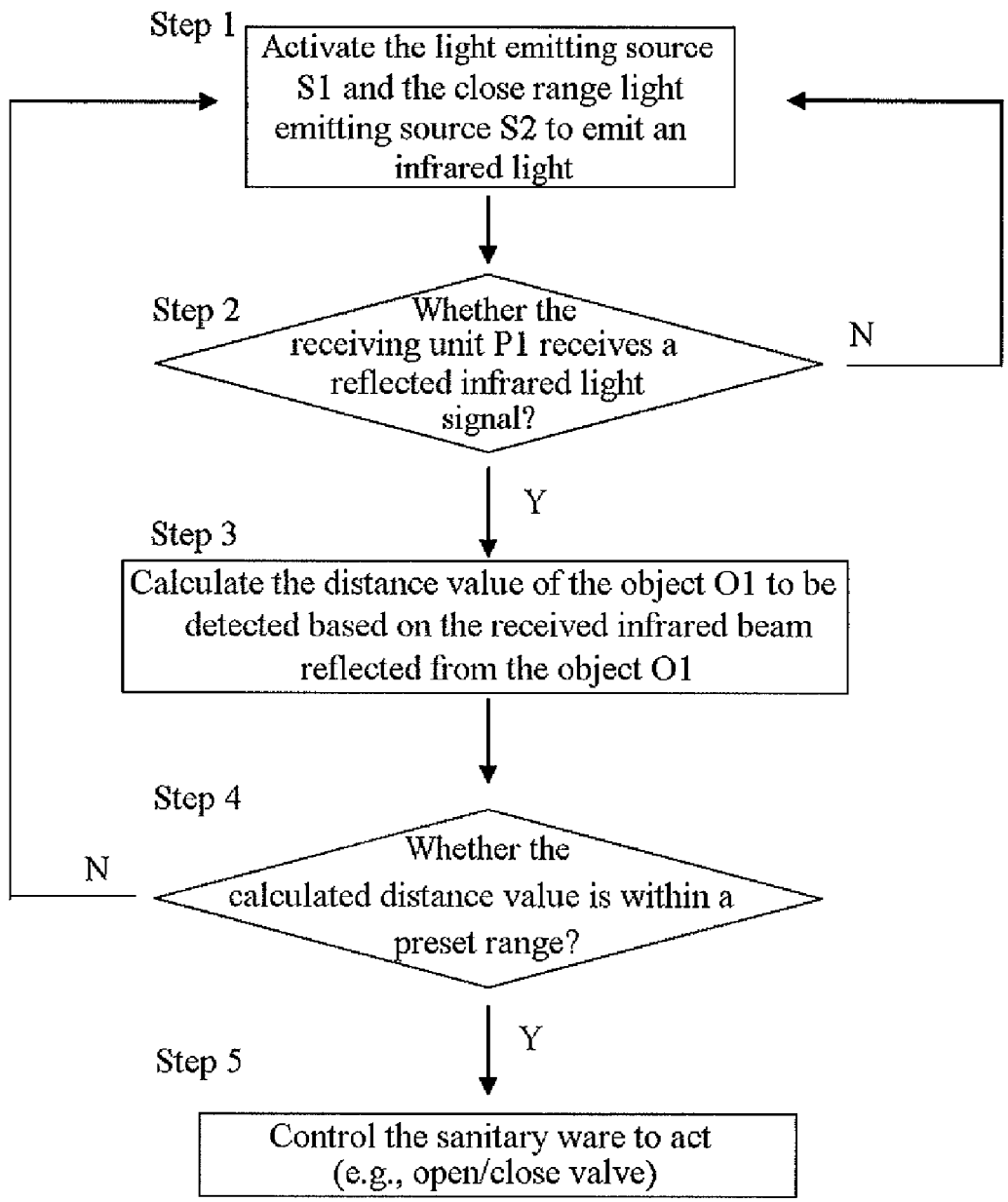
FIG. 4 is a flow chart of a close range detection method of a distance detecting sensor in accordance with another embodiment of the present invention.
Figure 5:
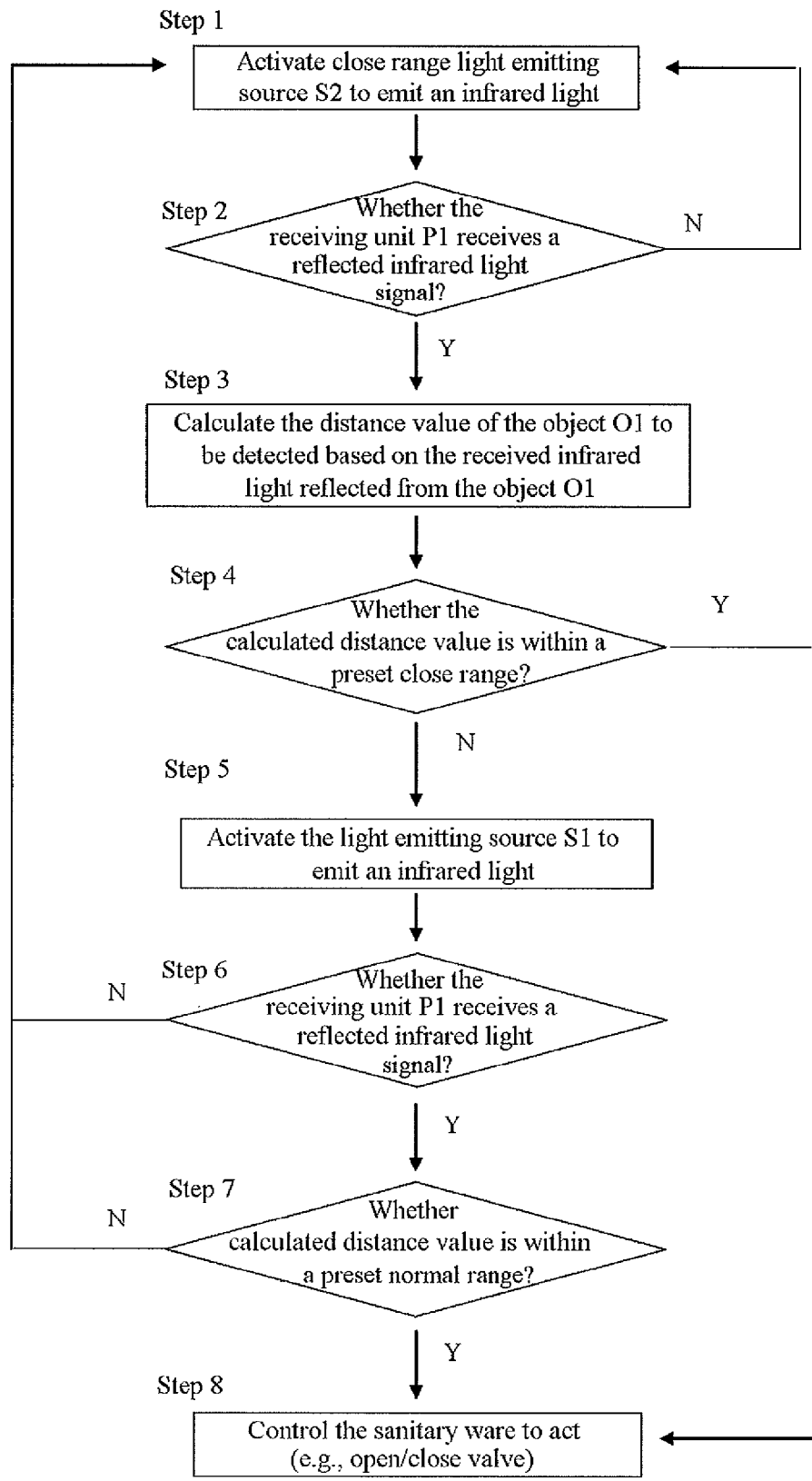
FIG. 5 is a flow chart of a close range detection method of a distance detecting sensor in accordance with still another embodiment of the present invention.

As shown in FIG. 3, a close range detection method of the distance detecting sensor 100 in accordance with the present invention mainly comprises the following steps:

Step 1: activating the light emitting source S1 to emit an infrared light, and proceeding to step 2;

Step 2: judging whether the receiving unit P1 (i.e., the PSD module) receives a reflected infrared light signal; if the receiving unit P1 receives a reflected infrared light signal, going to step 5; otherwise proceeding to step 3;

Step 3: activating the close range light emitting source S2 to emit an infrared light, and proceeding to step 4;

Step 4: judging whether the receiving unit P1 receives a reflected infrared light signal; if the receiving unit P1 receives a reflected infrared light signal, going to step 5; otherwise returning to step 1;

Step 5: calculating the distance value of an object O1 to be detected based on the received infrared light reflected from the object O1, and proceeding to step 6;

Step 6: judging whether the distance value of the object O1 is within the preset range; if the distance value of the object O1 is within the preset range, proceeding to step 7; otherwise returning to step 1;

Step 7: determining that some user wants to use or is using the sanitary ware, and controlling the corresponding sanitary ware by means of a main controller to perform operations such as opening or closing valve).

In accordance with the above preferred embodiment, if it is detected that an object is within the normal distance range, it is not necessary to activate the close range light emitting source, so that the power consumption can be saved more effectively. Of course, in accordance with another embodiment of the present invention, the close range light detection method of distance detecting sensor 100 in the present invention can be that: the light emitting source S1 and the close range light emitting source S2 emit an infrared light synchronously; then, it is judged whether the receiving unit P1 receives an infrared light, and whether the position of the object O1 to be detected is within a preset range; and finally, the operations (opening/closing the valve, and etc.) of the sanitary ware (faucet, urinal and etc.) is controlled according to the result of judgment. The specific steps of the method are as follows:

Step 1: activating a light emitting source S1 and a close range light emitting source S2 synchronously, and proceeding to step 2;

Step 2: judging whether a receiving unit P1 receives a reflected infrared light signal; if the receiving unit P1 receives a reflected infrared light signal, proceeding to step 3; otherwise returning to step 1;

Step 3: calculating the distance value of an object O1 to be detected based on the received infrared light reflected from the object O1, and proceeding to step 4;

Step 4: judging whether the distance value of the object O1 is within the preset range; if the distance value of the object O1 is within the preset range, proceeding to step 5; otherwise returning to step 1; wherein, the preset range includes a preset normal range and a preset close range.

Step 5: controlling the corresponding sanitary ware to perform operations such as opening or closing valve).

Furthermore, the emission frequency of infrared light when an object is detected is different from when no object is detected. The emission frequency is lower when no object is detected than when an object is detected. In a preferred embodiment of the present invention, the emission frequency of infrared light is once per 0.3s when no object O1 is detected, and is once per 0.15s when an object O1 is detected. Such an arrangement is favorable for saving of power consumption.

Furthermore, in actual applications, since the close range light emitting source S2 is used for close range detection, the power for activating the close range light emitting source S2 to emit infrared light is higher than the power for activating the light emitting source S1 to emit infrared light. In a preferred embodiment of the present invention, the current for activating the light emitting source S1 to emit infrared light is about 70 mA, while the current for activating the close range light emitting source S2 to emit infrared light is about 20 mA.

Since the power for activating the close range light emitting source S2 to emit infrared light is lower, the close range light emitting source S2 is normally open in another embodiment of the present invention. When an object is detected within the close range detection area, the sanitary ware will be controlled to profound actions such as opening valve.

The close range light emitting source S2 can also faintly detect whether an object O1 enters into the normal detection area. As a consequence, after the close range light emitting source S2 emits an infrared light and detects that an object O1 enters into the normal detection area, the light emitting source S1 is activated to emit an infrared light, to detect the object accurately. When an object is detected accurately in the normal detection area, it can be judged that the distance value of the object is within the preset range, and the corresponding sanitary ware is controlled to perform actions such as opening valve. This is helpful for saving of power consumption. The specific steps of the method are as follows:

Step 1: activating the close range light emitting source S2 to emit an infrared light, and proceeding to step 2;

Step 2: judging whether the receiving unit P1 receives an infrared light signal reflected from object O1 to be detected; if the receiving unit P1 receives a reflected infrared light signal, proceeding to step 3; otherwise returning to step 1;

Step 3: calculating the distance value of the object O1 based on the received infrared light signal reflected from the object O1, and proceeding to step 4;

Step 4: judging whether the distance value of the object O1 is within a preset close range; if the distance value is within the preset close range, going to step 8; otherwise proceeding to step 5;

Step 5: activating the light emitting source S1 to emitting an infrared light, and proceeding to step 6;

Step 6: judging whether the receiving unit P1 receives an infrared light signal reflected from the object O1; if the receiving unit P1 receives a reflected infrared light signal, proceeding to step 7; otherwise returning to step 1;

Step 7: judging whether the distance value of the object O1 is within a preset normal range; if the distance value is within the preset normal range, proceeding to step 8; otherwise returning to step 1;

Step 8: controlling the corresponding sanitary ware to perform actions (e.g. opening/closing valve, and etc.).

In addition, in the embodiments of the present invention, two or more close range light emitting sources S2 can be arranged to attain better close range detection effect.

Although some embodiments of the present invention have been disclosed above, the present invention is not limited to them. Those skilled in the prior art can make various modifications or variations to the embodiments described above without departing from the scope of the present invention.

The invention claimed is:

1. A distance detecting sensor for a sanitary ware, comprising:
   an infrared light emitting source,
   a close range light emitting source,
   an infrared light receiving unit,
   an emitting lens, and
   an receiving lens in front of the infrared light emitting source and the infrared light receiving unit, the receiving lens configured to focus infrared light;
   wherein the infrared light emitting source and the close range light emitting source are LEDs, and the infrared light receiving unit is a photoelectric device that is sensitive to the position of infrared light;
   wherein the close range light emitting source is arranged near the infrared light emitting source;
   wherein the emission frequency of the infrared light emitting source and the close range light emitting source is lower when there is no object to be detected than when there is an object to be detected.

2. The distance detecting sensor according to claim 1, wherein the emission power of the infrared light emitting source is higher than that of the close range light emitting source.

3. A distance detecting sensor for a sanitary ware, comprising:
   an infrared light emitting source,
   a close range light emitting source,
   an infrared light receiving unit,
   an emitting lens, and
   an receiving lens in front of the infrared light emitting source and the infrared light receiving unit, the receiving lens configured to focus infrared light;
   wherein the infrared light emitting source and the close range light emitting source are LEDs, and the infrared light receiving unit is a photoelectric device that is sensitive to the position of infrared light;
   wherein the close range light emitting source is arranged near the infrared light emitting source; and wherein a circuit of the distance detecting sensor is configured to cause a process comprising the following steps to be completed:
   step 1: activating the infrared light emitting source to emit an infrared light, and proceeding to step 2;
   step 2: judging whether the infrared light receiving unit receives a reflected infrared light signal; if the infrared light receiving unit receives a reflected infrared light signal, going to step 5; otherwise proceeding to step 3;
   step 3: activating the close range light emitting source to emit an infrared light, and proceeding to step 4;
   step 4: judging whether the infrared light receiving unit receives a reflected infrared light signal; if the infrared light receiving unit receives a reflected infrared light signal, proceeding to step 5; otherwise returning to step 1;
   step 5: calculating a distance value of an object to be detected based on the received infrared light reflected signal;
   step 6: judging whether the distance value of the object to be detected is within a preset range; if the distance is within the preset range, proceeding to step 7; otherwise returning to step 1;
   step 7: controlling the sanitary ware to perform an action.

4. The distance detecting sensor according to claim 3, wherein the emission power of the infrared light emitting source is higher than that of the close range light emitting source.

5. The distance detecting sensor according to claim 3, wherein the emission frequency of the infrared light emitting source and the emission frequency of the close range light emitting source are lower when there is no object to be detected than when there is an object to be detected.

6. A distance detecting sensor for a sanitary ware, comprising:
   an infrared light emitting source,
   a close range light emitting source,
   an infrared light receiving unit,
   an emitting lens, and
   an receiving lens in front of the infrared light emitting source and the infrared light receiving unit, the receiving lens configured to focus infrared light;
   wherein the infrared light emitting source and the close range light emitting source are LEDs, and the infrared light receiving unit is a photoelectric device that is sensitive to the position of infrared light;
   wherein the close range light emitting source is arranged near the infrared light emitting source; and wherein a circuit of the distance detecting sensor is configured to cause a process comprising the following steps to be completed:
   step 1: activating the infrared light emitting source and the close range light emitting source synchronously to emit infrared light from both sources, and proceeding to step 2;
   step 2: judging whether the infrared light receiving unit receives a reflected infrared light signal; if the infrared light receiving unit receives a reflected infrared light signal, proceeding to step 3; otherwise returning to step 1;

step 3: calculating a distance value of an object to be detected based on the reflected infrared light received from the object, and proceeding to step 4;

step 4: judging whether the distance value of the object is within a preset range; if the distance is within the preset range, proceeding to step 5; otherwise returning to step 1;

step 5: controlling the sanitary ware to perform an action.

7. The distance detecting sensor according to claim 6, wherein the emission power of the infrared light emitting source is caused to be higher than that of the close range light emitting source.

8. The distance detecting sensor according to claim 6, wherein the emission frequency of the infrared light emitting source and the emission frequency of the close range light emitting source are caused to be lower when there is no object to be detected than when there is an object to be detected.

9. A distance detecting sensor for a sanitary ware, comprising:
an infrared light emitting source,
a close range light emitting source,
an infrared light receiving unit,
an emitting lens, and
an receiving lens in front of the infrared light emitting source and the infrared light receiving unit, the receiving lens configured to focus infrared light;
wherein the infrared light emitting source and a close range light emitting source are LEDs, and the infrared light receiving unit is a photoelectric device that is sensitive to the position of infrared light;
wherein the close range light emitting source is arranged near the infrared light emitting source; and wherein a circuit of the distance detecting sensor is configured to cause the following steps to be completed:

step 1: activating the close range light emitting source to emit an infrared light, and proceeding to step 2;

step 2: judging whether the infrared light receiving unit receives an infrared light signal reflected from an object to be detected; if the infrared light receiving unit receives a reflected infrared light signal, proceeding to step 3; otherwise returning to step 1;

step 3: calculating a distance value of the object to be detected based on the received infrared light, and proceeding to step 4;

step 4: judging whether the distance value of the object is within a preset close range; if the distance value is within the preset close range, going to step 8; otherwise proceeding to step 5;

step 5: activating the infrared light emitting source to emit an infrared light, and proceeding to step 6;

step 6: judging whether the infrared light receiving unit receives an infrared light signal reflected from the object; if the infrared light receiving unit receives a reflected infrared light signal, proceeding to step 7; otherwise returning to step 1;

step 7: judging whether the distance value of the object to be detected is within a preset normal range; if the distance value is within the preset normal range, proceeding to step 8; otherwise returning to step 1;

step 8: controlling the corresponding sanitary ware to perform an action.

10. The distance detecting sensor according to claim 9, wherein the emission power of the infrared light emitting source is higher than that of the close range light emitting source.

11. The distance detecting sensor according to claim 9, wherein the emission frequency of the infrared light emitting source and the emission frequency of the close range light emitting source are caused to be lower when there is no object to be detected than when there is an object to be detected.

* * * * *